United States Patent Office.

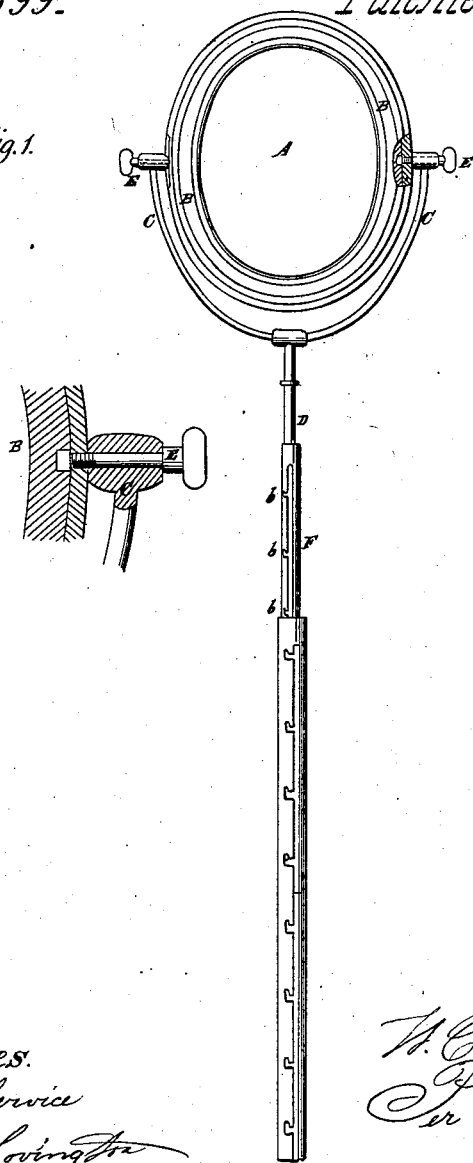

WILLIAM C. CUMMING, OF PEEKSKILL, NEW YORK.

Letters Patent No. 60,699, dated January 1, 1867.

IMPROVED MANNER OF HANGING MIRRORS.

*The Schedule referred to in these Letters Patent and making part of the same.*

TO ALL WHOM IT MAY CONCERN:

Be it known that I, W. C. CUMMING, of Peekskill, in the county of Westchester, and State of New York, have invented a new and useful "Improvement in the Hanging of Mirrors and Looking-Glasses;" and I do hereby declare that the following is a full, clear, and exact description thereof, which will enable others skilled in the art to understand the same, reference being had to the accompanying drawing, forming part of this specification.

The present invention consists in so hanging or suspending a mirror or looking-glass that it can not only be lowered or raised in height, but also brought to any desired inclination at pleasure, and set or sustained in such positions, whereby the adjustment of the mirror to suit the exigencies or requirements of the occasion is secured, the importance of which in the operations of the toilet, especially with ladies, is too self-evident to need any more particular mention herein; the said adjustments of the mirror being entirely independent of each other.

In accompanying plate of drawings my improvements are illustrated—

Figure 1 being a front view of a mirror or looking-glass hung or suspended according to the present invention; and Figure 2, a detail view to be hereinafter referred to.

A, in the drawings, represents an ordinary mirror or looking-glass, made of an oval shape and enclosed or secured in a similar-shaped frame, B, but which may be made of a round, square, or any other suitable shape. This mirror frame, B, at points diametrically opposite to each other in its transverse or shorter length or diameter, is suspended in and between the ends of the bifurcated or forked arms, $c$, of a rod, D, which arms, by means of set or thumb-screws, E, are secured to the mirror frame, (see fig. 2;) the frame swinging by such set-screws in the said arms $c$; or, in other words, the arms swinging upon the set-screws, as is manifest, the arms being "jammed" against the mirror frame when desired to hold or fasten the mirror in any position, by simply turning the said set or thumb-screws in the proper direction therefor. The rod D, between the forked end of which the mirror is hung or suspended, as above explained, has a loose sleeve or tube, F, placed, which is slotted in the direction of, but not for its entire length, in which slot a fixed stud or pin of the rod D plays, and by drawing it out and engaging its stud at the proper notch of the series of notches, $b$, of the slot, the height of the mirror or looking-glass can be regulated at pleasure, and either made more or less within the limits or extent of the said sleeve F, as is obvious without any further explanation; this vertical adjustment of the mirror being increased, as is apparent, by simply increasing the number of the loose sleeves or tubes about the centre rod D, and similarly slotting and notching them to correspond to that of the sleeve E, the mirror being suspended by it to the ceiling or wall, or other suitable part of a room, by the opposite end of the several sleeves used to that at which it is hung between the forked ends or arms of the rod D.

From the above description it is plainly apparent that a mode of suspending or hanging for mirrors or looking-glasses is produced by my invention, which is not only cheap and simple, but reliable, and, furthermore, of the greatest advantage and importance in dressing-rooms, especially ladies', where it is oftentimes desirable to bring or set the mirror at various heights, angles, and inclinations, to obtain the required view of the person while arranging the toilet.

Having thus described my invention, what I claim as new, and desire to secure by Letters Patent, is—

The slotted and notched sleeves or tubes F, whether one or more, for the rod D, to which the mirror is attached, substantially as and for the purpose specified.

The above specification of my invention signed by me this 10th day of May, 1866.

WILLIAM C. CUMMING.

Witnesses:
ALBERT W. BROWN,
ALEX. F. ROBERTS.